United States Patent
Komatsu et al.

(10) Patent No.: US 12,202,639 B2
(45) Date of Patent: Jan. 21, 2025

(54) HEAT-SEAL DEVICE

(71) Applicants: Yakult Honsha Co., Ltd., Tokyo (JP); Shikoku Kakoki Co., Ltd., Tokushima (JP)

(72) Inventors: Kunio Komatsu, Tokyo (JP); Masato Yamada, Itano-gun (JP); Takanori Yabuuchi, Itano-gun (JP)

(73) Assignees: YAKULT HONSHA CO., LTD., Tokyo (JP); SHIKOKU KAKOKI CO., LTD., Itano-gun (JP)

( * ) Notice: Subject to any disclaimer, the term of this patent is extended or adjusted under 35 U.S.C. 154(b) by 0 days.

(21) Appl. No.: 17/910,769

(22) PCT Filed: Mar. 11, 2021

(86) PCT No.: PCT/JP2021/009718
§ 371 (c)(1),
(2) Date: Sep. 9, 2022

(87) PCT Pub. No.: WO2021/187293
PCT Pub. Date: Sep. 23, 2021

(65) Prior Publication Data
US 2023/0117653 A1    Apr. 20, 2023

(30) Foreign Application Priority Data
Mar. 16, 2020    (JP) .................................. 2020-45005

(51) Int. Cl.
*B65B 7/28*    (2006.01)
*B29C 65/00*    (2006.01)
*B65B 51/10*    (2006.01)

(52) U.S. Cl.
CPC ...... *B65B 7/2878* (2013.01); *B29C 66/91951* (2013.01); *B65B 51/10* (2013.01)

(58) Field of Classification Search
CPC ....... B29C 66/90; B29C 66/91; B29C 66/919; B29C 66/91951; B29C 66/8322;
(Continued)

(56) References Cited

U.S. PATENT DOCUMENTS 3,759,013 A * 9/1973 Zimmermann ... B29C 66/24221
53/329.3
3,760,563 A * 9/1973 Zimmermann ......... B29C 66/80
53/329.3
(Continued)

FOREIGN PATENT DOCUMENTS

JP    H01-213115 A    8/1989
JP    2002-048239 A    2/2002
(Continued)

OTHER PUBLICATIONS

International Search Report for International Application No. PCT/JP2021/009718 dated May 18, 2021 (5 sheets).
(Continued)

*Primary Examiner* — Dariush Seif
(74) *Attorney, Agent, or Firm* — Kratz, Quintos & Hanson, LLP

(57) ABSTRACT

The purpose of the present invention is to provide a heat-sealing device capable of preventing problems associated with cap sealing performance and/or sensation of the cap being open due to an inappropriate cap temperature. For this purpose, this heat-sealing device (10), which is used in a manufacturing apparatus (100) for manufacturing a product for which an opening part (1A: mouth part) of a container (1) is sealed with a cap (2), is provided with: a pressing plate (5) which is disposed on a path along which the containers (1) move; a heating unit (3) and sealing heads (4) for pressing the caps (2) sealing the container (1), the heating unit (3) and sealing heads (4) being arranged on the pressing plate (5); a temperature measurement device (7) for measuring the
(Continued)

temperatures of the sealing heads (4); and a control device (8: control unit) for transmitting control signals to a container conveyance drive source (for example, inverter) in accordance with the measurement results from the temperature measurement device (7).

9 Claims, 5 Drawing Sheets

(58) Field of Classification Search
CPC ............ B29C 66/53461; B29C 66/112; B29C 66/131; B29C 66/24221; B29C 66/72321; B29C 66/8161; B29C 66/849; B29C 65/18; B65B 7/2878; B65B 7/164; B65B 7/2807; B65B 7/28; B65B 7/2842; B65B 51/227; B65B 51/14; B65B 51/00; B65B 51/10; B65B 51/26; B65B 31/028; B65B 57/04; B65B 2051/105
See application file for complete search history.

(56) References Cited

U.S. PATENT DOCUMENTS

| | | | | |
|---|---|---|---|---|
| 3,908,340 A * | 9/1975 | Erhardt | B29C 65/7867 | 53/329.3 |
| 3,950,922 A * | 4/1976 | Eberhardt | B67B 3/14 | 53/356 |
| 3,965,656 A * | 6/1976 | Gerben | B65B 7/164 | 53/329.4 |
| 4,042,148 A * | 8/1977 | Gerben | B65B 43/52 | 221/222 |
| 4,246,461 A * | 1/1981 | Jeppson | B29C 66/72321 | 156/69 |
| 4,261,502 A * | 4/1981 | Ohmori | B29C 66/81427 | 229/404 |
| 4,282,699 A * | 8/1981 | Embro, Jr. | B65B 7/164 | 53/367 |
| 4,297,161 A * | 10/1981 | Graffin | B29C 66/8322 | 156/212 |
| 4,414,056 A * | 11/1983 | Buchholz | B65C 3/20 | 156/476 |
| 4,447,184 A * | 5/1984 | Buri | B29C 66/7392 | 413/2 |
| 4,691,500 A * | 9/1987 | Danforth | B65B 7/2878 | 53/374.6 |
| 4,746,391 A * | 5/1988 | Heyse | B29C 66/0342 | 156/359 |
| 4,771,903 A * | 9/1988 | Levene | B65B 7/2878 | 53/485 |
| 4,816,110 A * | 3/1989 | Foldesi | B65B 7/2807 | 53/DIG. 2 |
| 4,838,008 A * | 6/1989 | Hardy | B65B 7/2878 | 53/425 |
| 4,892,029 A * | 1/1990 | Walter | B65B 7/2878 | 198/478.1 |
| 4,961,513 A * | 10/1990 | Gossedge | B29C 65/18 | 220/276 |
| 4,991,375 A * | 2/1991 | Raque | B29C 66/8322 | 198/803.14 |
| 5,025,123 A * | 6/1991 | Pfaffmann | B29C 66/8242 | 53/DIG. 2 |
| 5,109,653 A * | 5/1992 | Kubis | B29C 66/72321 | 53/DIG. 2 |
| 5,117,613 A * | 6/1992 | Pfaffmann | B29C 66/112 | 53/DIG. 2 |
| 5,155,969 A * | 10/1992 | Kuethe | B65B 31/028 | 53/97 |
| 5,160,391 A * | 11/1992 | Thomas, Jr. | B29C 66/91421 | 53/485 |
| 5,164,208 A * | 11/1992 | Thomas, Jr. | B29C 66/81815 | 156/581 |
| 5,179,814 A * | 1/1993 | Osti | B29C 66/834 | 53/77 |
| 5,230,203 A * | 7/1993 | Wu | B67C 7/00 | 53/503 |
| 5,240,133 A * | 8/1993 | Thomas, Jr. | B29C 65/76 | 220/276 |
| 5,295,343 A * | 3/1994 | Ueda | B29C 65/7841 | 53/373.4 |
| 5,371,996 A * | 12/1994 | Ueda | B65B 7/164 | 53/298 |
| 5,428,943 A * | 7/1995 | Balcombe | B65B 31/028 | 53/433 |
| 5,562,799 A * | 10/1996 | Ross | B29C 66/742 | 413/5 |
| 5,623,816 A * | 4/1997 | Edwards | B29C 66/849 | 53/499 |
| 5,689,937 A * | 11/1997 | Gorlich | B26D 7/10 | 53/433 |
| 5,729,959 A * | 3/1998 | Spatafora | B29C 66/0242 | 53/550 |
| 5,979,748 A * | 11/1999 | Drummond | B29C 66/7234 | 229/5.5 |
| 6,202,388 B1 * | 3/2001 | Sanfilippo | B65B 31/028 | 53/510 |
| 6,223,506 B1 * | 5/2001 | Ghini | B65B 51/14 | 53/232 |
| 6,263,644 B1 * | 7/2001 | Ghini | B65B 51/16 | 53/466 |
| 6,362,461 B1 * | 3/2002 | Wiening | B65B 7/28 | 219/604 |
| 6,487,831 B1 * | 12/2002 | Turra | B65B 51/16 | 53/234 |
| 10,144,541 B2 * | 12/2018 | Rea | B65B 35/18 | |
| 2003/0121143 A1 | 7/2003 | Farmer | | |
| 2004/0206048 A1 * | 10/2004 | Iuchi | B65B 7/164 | 53/329.2 |
| 2004/0250515 A1 * | 12/2004 | Rimondi | B65B 31/044 | 53/551 |
| 2005/0160698 A1 * | 7/2005 | Caffeo | B65B 7/2878 | 53/290 |
| 2005/0252171 A1 * | 11/2005 | Brautigam | B65B 7/2878 | 53/329.3 |
| 2006/0288663 A1 * | 12/2006 | Herzog | B29C 66/91431 | 53/478 |
| 2007/0056251 A1 * | 3/2007 | Ruppman | B67C 3/222 | 53/512 |
| 2008/0202537 A1 * | 8/2008 | Spatafora | B29C 66/0042 | 131/281 |
| 2010/0107568 A1 * | 5/2010 | Inaba | B29C 66/83423 | 53/370.7 |
| 2013/0248107 A1 * | 9/2013 | Straub | B29C 66/8242 | 156/308.2 |
| 2014/0116002 A1 * | 5/2014 | Denny | B29C 65/7841 | 53/329.2 |
| 2016/0152360 A1 * | 6/2016 | Minnette | B29C 66/81431 | 53/167 |
| 2017/0197744 A1 * | 7/2017 | Larroche | B65B 31/028 | |
| 2017/0349311 A1 * | 12/2017 | Stone | B29C 66/542 | |
| 2020/0346414 A1 * | 11/2020 | Orchard | B65B 7/164 | |
| 2021/0214135 A1 * | 7/2021 | Coates | A23L 2/54 | |
| 2021/0284368 A1 * | 9/2021 | Moran | B65B 7/164 | |
| 2021/0284514 A1 * | 9/2021 | Whincup | B65D 1/023 | |

FOREIGN PATENT DOCUMENTS

| | | | | |
|---|---|---|---|---|
| JP | 2004-189323 A | | 7/2004 | |
| JP | 2005-035643 A | | 2/2005 | |
| JP | 2006069641 A | * | 3/2006 | ............ B29C 65/18 |
| JP | 2009-190761 A | | 8/2009 | |
| JP | 2015-134620 A | | 7/2015 | |

OTHER PUBLICATIONS

European Search Report for European Patent Application No. 21771846.9 dated Mar. 13, 2024 (8 sheets).

(56) References Cited

OTHER PUBLICATIONS

Office Action of Japanese Patent Application No. 2002-508270 dated May 16, 2024 (6 sheets).

* cited by examiner

HEAT-SEAL DEVICE

TECHNICAL FIELD

The present invention relates to a heat-seal device, more detail, relates to a heat-seal device having a function of carrying out an optimal heat-sealing on the basis of a temperature of an elastic material being in contact with a seal member.

BACKGROUND ART

An opening portion (mouth portion) of a container (made of a resin container, for example) accommodating various types of drink is sealed with a cap (a cap made of aluminum, for example) in some cases in a manufacturing process. By means of carrying out such sealing, leakage of the drink, which is a content, or intrusion of foreign substances into the container or the drink is prevented. Here, sealing of the mouth portion of the container with the cap is carried out or performed in a filling machine in a manufacturing line.

The filling machine for filling the drink in a container is combined with cutting heads, and the container filled with the drink is covered with the cap (capped). At the time of capping, the cap does not seal the container but it is in a state that the cap is merely placed on the container.

After the container being placed on conveying means is covered with the cap, when the sealing is to be carried on, the cap is pressed onto the container by a seal head at first.

Then, in a case that the cap made of metal (aluminum or the like), for example, an eddy current is generated by electromagnetic induction so as to cause the cap itself to be heated. A hotmelt is applied on the container side of the cap, the hotmelt is melted by being heated the cap itself, and the cap adheres to the mouth portion of the container.

Here, an elastic material (silicon rubber, for example) is disposed on the seal head pressing the cap, in order to press the cap onto the container uniformly. A temperature of the elastic material is not particularly measured in the prior art, and the cap made of metal, for example, was adhered to the container by the hotmelt regardless the temperature of the elastic material.

However, even if the eddy current generated by the electromagnetic induction is constant, in a case that the temperature of the elastic material is low, the heat of the cap generated as the result of the induction heating is transferred to elastic material, the temperature of the cap does not rise and an adhesion of the cap by the hotmelt becomes insufficient, and therefore, a problem in a sealing performance is generated (a defective sealing is generated). Moreover, if an induction heating amount is set larger in conformity to a case that the temperature of the elastic material is low, when the temperature of the elastic material rises, the sealing becomes too strong and/or a container flange portion is melted or the like nonconformity occurs, which nonconformity generates a problem when the seal is to be opened ("defective sealing" and/or a "problems in the feeling at opening" are generated).

As another prior art, a heat-seal device which measures the temperature of the seal head and adjusts the temperature to an appropriate temperature is disclosed (see Patent Literature 1). However, in the above-mentioned prior art, occurrence of the defective sealing and the "problems in the feeling at opening" as described above cannot be prevented.

CITATION LIST

Patent Literature

[Patent Literature 1]
Japanese Patent Application Publication No. 2004-189323

SUMMARY OF INVENTION

Technical Problem

The present invention was proposed in view of the above-mentioned problems of the prior art and an object of the present invention is to provide a heat-seal device which can prevent occurrence of the defective sealing or "problems in the feeling at opening" due to an inappropriate cap heating amount.

Solution to Problem

A heat-seal device (10) of the present invention is the heat-seal device (10) used in a manufacturing apparatus (100) manufacturing a product, in which product an opening portion (1A; mouth portion) of a container (1: container made of resin, for example) is sealed with a cap (2: cap made of aluminum, for example), characterized in that a pressurizing plate (5) is provided in a path on which the container (1) moves, a seal head (4) which presses the cap (2) covering the container (1) and a heating portion (3) are provided on the pressurizing plate (5), a temperature measuring device (7: non-contact type infrared thermometer, for example) which measures a temperature of the seal head (4) and a control device (8: control unit) which transmits a control signal to a container-conveyance drive source (inverter, for example) in accordance with a measurement result of the temperature measuring device (7) are comprised.

In the present invention, the control device (8) preferably has a function of adjusting a moving speed of the container (1) in accordance with the temperature of the seal head (4) such that;

in a case that the temperature of the seal head (4) is low, the moving speed is slowed, and in a case that the temperature of the seal head (4) is high, the moving speed is quickened, so that heating time of the cap (2) is adjusted And in the present invention, it is preferable that a container detection sensor (9) is provided on an upstream side (side in which the container 1 is supplied) of the temperature measuring device (7), and there are functions such that:

the temperature measuring device (7) starts temperature measurement of the seal head (4) after certain time has elapsed since the container detection sensor (9) detects the container (1), and at time of start of the sealing, a control signal of the control device (8) has been transmitted to the container-conveyance drive source (inverter, for example), and the adjustment of the moving speed of the container (1) has been completed.

Alternatively, in the present invention, it is preferable that an elastic material (6) is disposed at a portion being contacted with the container mouth portion of the seal head (4), and the temperature measuring device carries out the temperature measurement of the elastic material (6).

Moreover, it is preferable that the seal heads (4) are disposed on the pressurizing plate (5) circumferentially, and the containers (1) brought into contact with the seal heads (4) move in synchronicity with rotation of the pressurizing plate.

And it is preferably to carry out a heating of the cap (2) by means of induction heating.

A method of using the heat-seal device (10) of the present invention mentioned above is characterized in that the temperature of the seal head (4) is measured by the temperature measuring device (7: non-contact type infrared thermometer, for example), the control signal is transmitted to the container-conveyance drive source (inverter, for example) based on the temperature measurement result of the seal head (4), and the heating time of the cap (2) is determined in accordance with the temperature of the seal head (4).

Advantageous Effects of Invention

According to the present invention comprising the aforementioned constructions, since there are the temperature measuring device (7: non-contact type infrared thermometer, for example) which measures the temperature of the seal head (4) and the control device (8: control unit) having a function of adjusting the moving speed of the container in accordance with the temperature of the seal head (4), in a case that the temperature of the seal head (4) is low, for example, by means of decelerating the moving speed of the container (1) so as to extend the time for heating (induction heating, for example), the temperature of the cap (2) can be raised to a desired temperature. As a result, the cap (2) is reliably bonded to the container (1) by the hotmelt, and the defective sealing can be prevented.

On the other hand, in a case that the temperature of the seal head (4) is high, the moving speed of the container (1) is quickened (accelerated) so as to shorten the time for heating (induction heating, for example) the cap (2). As a result, the temperature of the cap (2) is kept within a pre-determined range, and such nonconformity that the sealing becomes too strong or the flange portion of the container (1) is melted, etc. can be prevented, and occurrence of the "problems in the feeling at opening" or the defective sealing can be prevented.

In other words, in the present invention, since the moving speed of the container (1) is controlled based on the temperature of the elastic material (6) disposed on the pressurizing plate (5) as a control parameter, the problems of the defective sealing and the "problems in the feeling at opening" can be prevented.

In the present invention, in a case that the container detection sensor (9) is provided on the upstream side (side in which the container 1 is supplied) of the temperature measuring device (7), the temperature measuring device (7) starts the temperature measurement of the seal head (4) after certain time has elapsed since the container detection sensor (9) detects the container, and that the control signal of the control device (8) has been transmitted to the container-conveyance drive source (inverter, for example), and the adjustment of the container conveying speed has been completed, at the time of start of the sealing, the heat sealing can be carried out efficiently at appropriate timing.

DESCRIPTION OF EMBODIMENTS

Hereinafter, an embodiment of the present invention will be explained with reference to the attached drawings.

In the illustrated embodiment, a container 1 is made of resin, a cap 2 is made of aluminum, and an elastic material 6 is made of silicon rubber, for example. However, the container 1, the cap 2 and the elastic material 6 can be made of the other materials.

Figure 1:
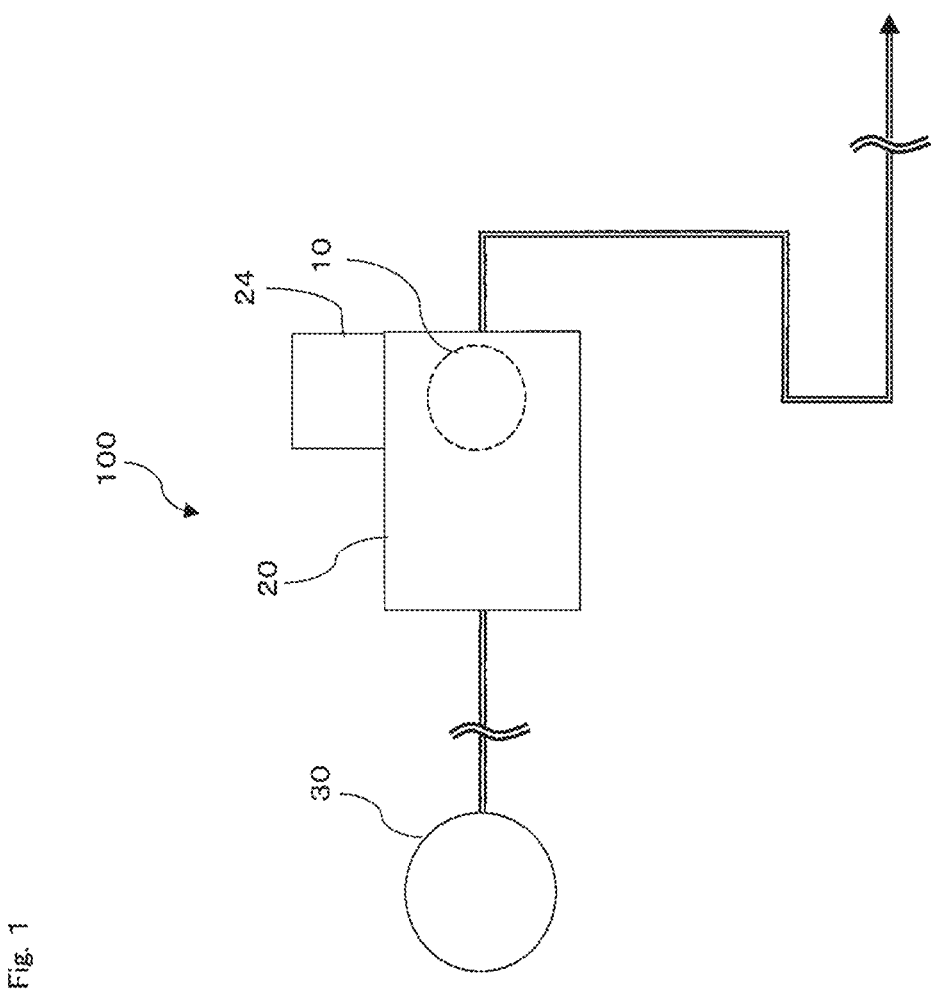
FIG. 1 is an explanatory diagram illustrating a manufacturing line to which an embodiment of the present invention is applied.

In FIG. 1, a filling machine 20 is installed in a manufacturing apparatus 100, and the container 1 is filled with drink by the filling machine 20, after the container 1 is covered with a cap (after capping), the container 1 is sealed. Moreover, since the cap 2 is in a state that it is placed on the container 1 merely and the cap 2 is not bonded to the container 1 at the time of capping, a heat-seal device 10 is provided in the filling machine 20, and the cap 2 is bonded to the container 1 by the heat-seal device 10. Furthermore, in the manufacturing apparatus 100, an inspecting device and a manufacturing device are provided in an upstream side and/or a downstream side of the filling machine 20 as necessary.

Although not shown clearly, an aligning machine 30 has a function of aligning opening portions (mouth portions) of the containers 1 in a manner that the opening portions are directed upward, and a function of transferring the containers to a subsequent process sequentially.

Figure 2:
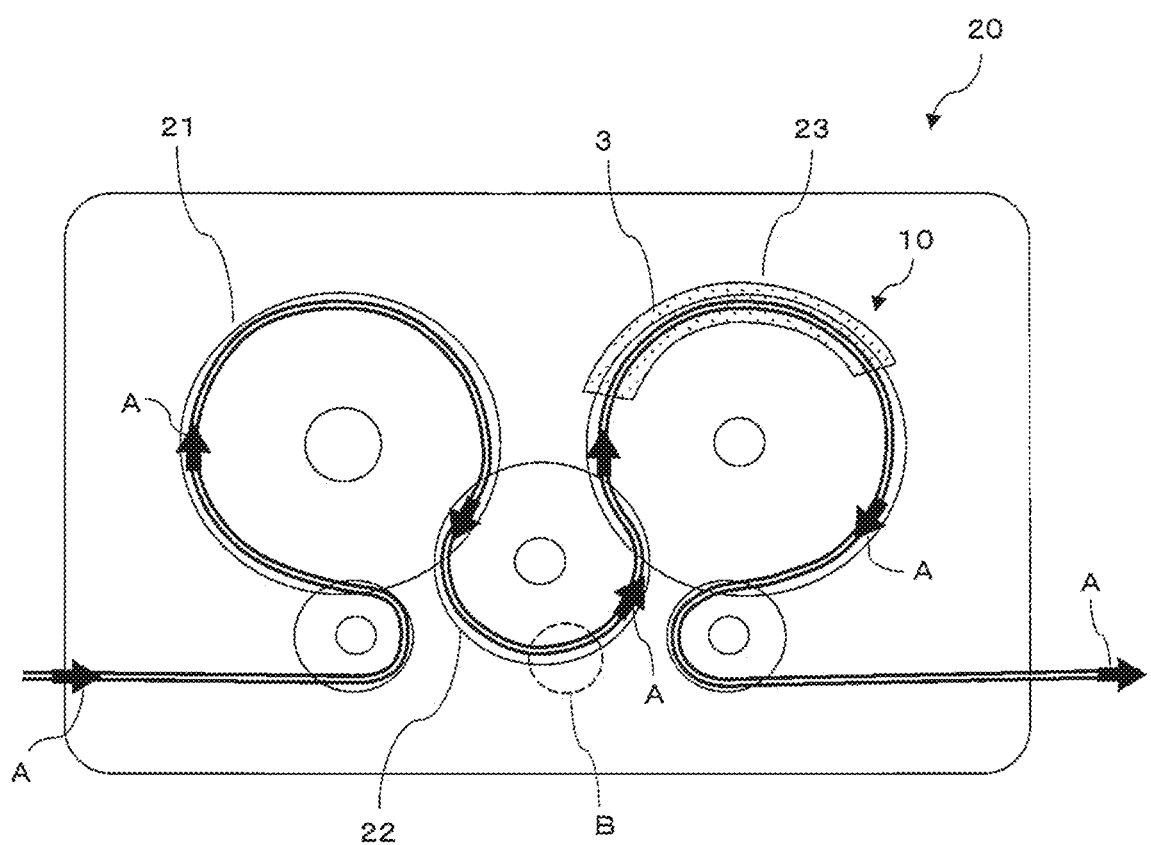
FIG. 2 is a plane view illustrating a filling machine in the manufacturing line shown in FIG. 1.

Here, the filling machine 20 comprises a filling portion 21, an intermediate star wheel 22 and a seal portion 23 (see FIG. 2). A path of the container 1 (see FIG. 3 and FIG. 4) moving in the filling machine 20 is indicated by an arrow A shown in FIG. 2.

A region indicated by a sign B (indicated by a broken-line circle) of the intermediate star wheel 22 is a region at which the cap 2 molded by a cutting head 24 (see FIG. 1) is capped to the container 1 (capping).

The wheel-shaped seal portion 23 comprises the heat-seal device 10, the heat-seal device 10 comprises the heating portion 3, and the cap 2 capping the container 1 is heated in the heating portion 3. A thermoplastic resin (hotmelt) is applied on the container side of the cap 2, and the hotmelt is melted and bonds the cap 2 to the container 1 by heating with the heating portion 3.

Figure 3:
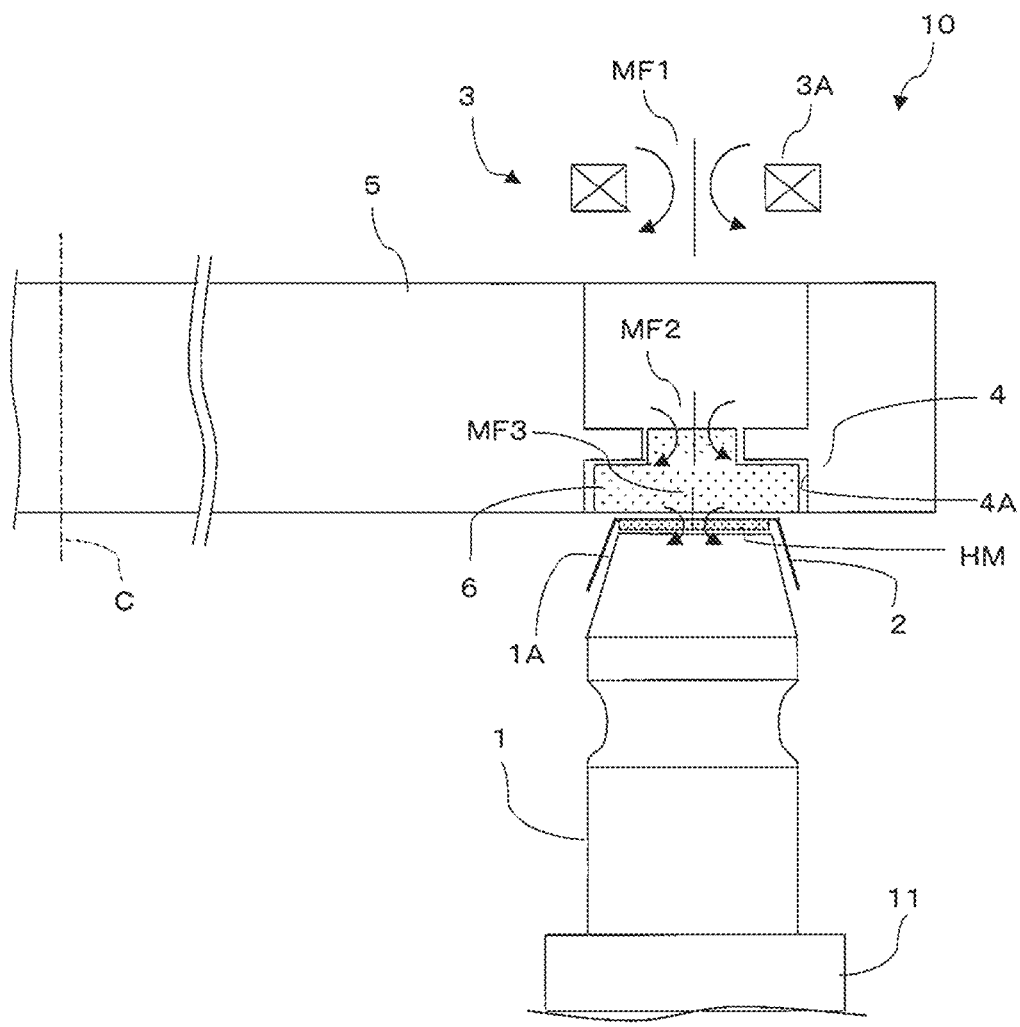
FIG. 3 is an enlarged front explanatory view illustrating an essential part of the filling machine.

In FIG. 3, the heat-seal device 10 of the seal portion 23 (FIG. 2) of the filling machine 20 comprises the heating portion 3, the disc-shaped pressurizing plate 5 and the seal head 4, and the seal head 4 constructs a part of the pressurizing plate 5 and has a function of pressurizing the aluminum cap 2 being capped to the container 1.

Figure 4:
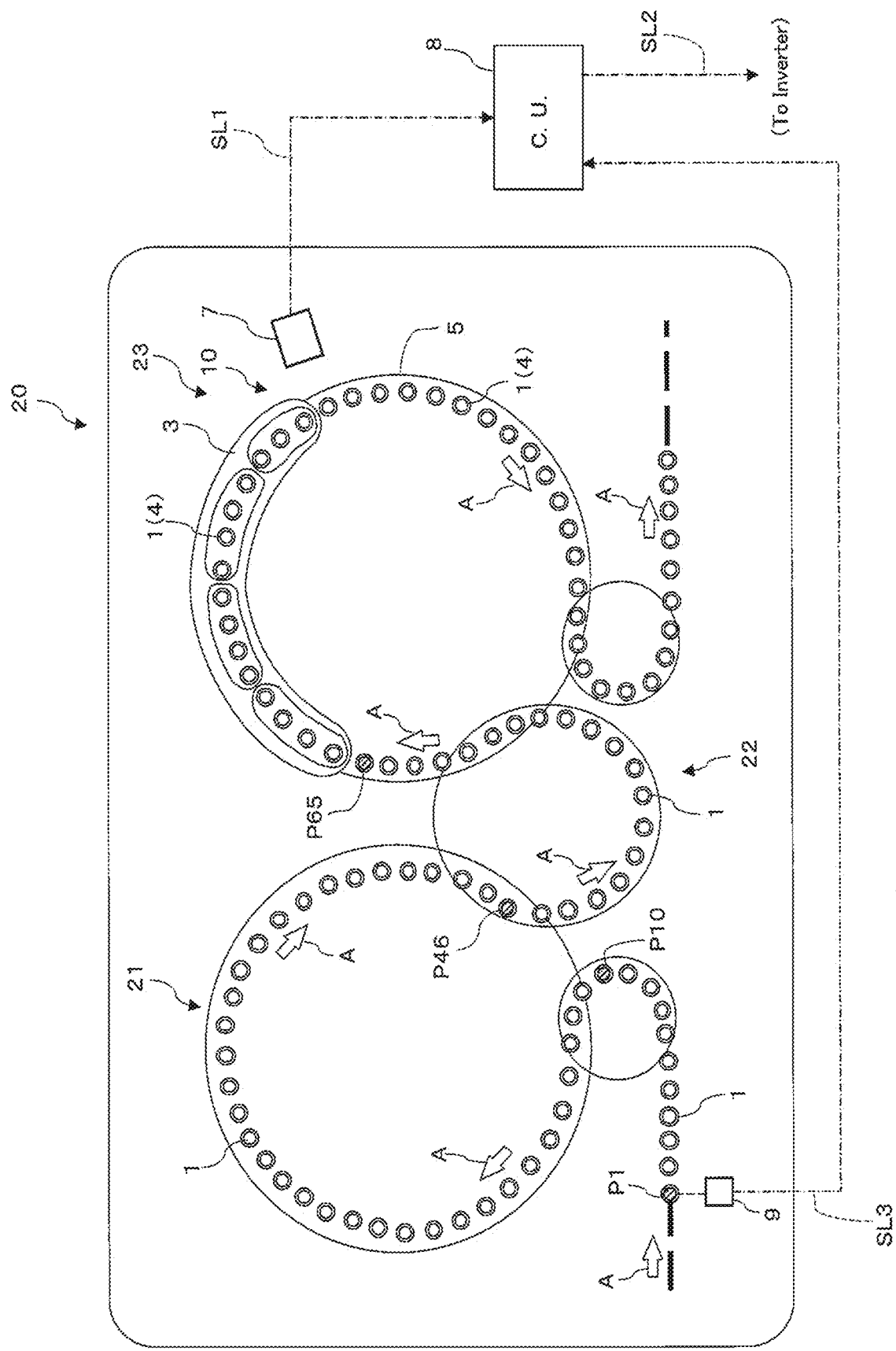
FIG. 4 is a block diagram of the filling machine.

The pressurizing plate 5 has a disc shape a center axis of which is shown by a broken line C, and as shown in FIG. 4, a plurality of the seal heads 4 (36 pieces, for example) are provided in a circumferential direction in the vicinity of an outer periphery of the pressurizing plate 5. In FIG. 3, only one of the seal heads 4 is shown, which heads are disposed in plural in the circumferential direction of the pressurizing plate 5.

An accommodating portion 4A is formed on the container 1 side (lower side in FIG. 3) of the seal head 4, and silicon rubber 6, which is an elastic material, is disposed in the accommodating portion 4A. Details of the silicon rubber will be explained later.

A movement path of the plurality of seal heads 4 of the pressurizing plate 5 constructs a part of the conveyance path of the container 1 in the seal portion 23 (FIG. 2). And the pressurizing plate 5 rotates around the center axis C and presses the aluminum cap 2 onto the container 1 through the silicon rubber 6 of the seal head 4, thereby the container 1 is conveyed.

As shown in FIG. 3, the mouth portion 1A (opening portion) on the upper end of the container 1 being positioned on the conveying means 11 is capped with the aluminum cap 2, and as described above, the cap 2 is pressed onto the side of container 1 (lower side in FIG. 3) through the silicon rubber 6.

The hotmelt (shown by a character HM in FIG. 3) is applied on the container 1 side of the cap 2, the aluminum cap 2 is self-heated by induction heating carried out by the heating portion 3 which is provided in the conveyance path of the container 1, the hotmelt HM is melted, and the cap 2 is bonded to the mouth portion 1A of the container 1.

An area being above the pressurizing plate 5, a heating coil 3A constructing the heating portion 3 is disposed. By applying a high-frequency current through the heating coil 3A, a primary magnetic field MF1 is generated in the heating coil 3A, and then, when a secondary magnetic field MF2 is generated in the seal head 4 by the primary magnetic field MF1, a third magnetic field MF3 is generated in the aluminum cap 2, and an eddy current is generated in the aluminum cap 2 by the third magnetic field MF2, thereby the aluminum cap 2 is heated.

Although not shown clearly, the heating coil 3A and means for supplying the high-frequency current (not shown) are provided in an area being above the seal head 4 of the pressurizing plate 5 shown in FIG. 3.

In the embodiment shown in the drawings, the pressurizing plate 5 has a disc shape, the seal head 4 is disposed on the circumference in the pressurizing plate 5, and a heating method is the induction heating. However, there is not a limitation of the construction particularly, and there is not a problem in a case that the seal head 4 is disposed in a linear manner, for example, and it is not necessary for the heating method (manner) to be the induction heating but it is possible to select other heating manner as appropriate in accordance with the other constructions.

Moreover, the silicon rubber 6 is described as an example for the elastic material disposed in the accommodating portion 4A being below the pressurizing plate 5, but as the elastic material, there is not particular limitation as long as it is a material having elasticity, heat resistance, a mold release performance (nature not to adhere to a mold), insulation (non-conductivity), and hygiene. In other words, the silicon rubber is on of examples of a material having the above-mentioned properties (characteristics) and it is possible to select a silicon rubber a surface of which is covered by a fluorine resin ("Teflon", Registered Trademark).

In FIG. 3, when the aluminum cap 2 is pressed onto the container 1 side through the silicon rubber 6, as described above, if the temperature of the silicon rubber 6 being contact with the aluminum cap 2 is low temperature, the heat of the aluminum cap 2 is transferred to the silicon rubber 6. Thus, the temperature of the aluminum cap 2 does not rise, the hotmelt is not melted sufficiently, and a sealing performance at a seal spot or an adhesion spot between the aluminum cap 2 and the container 1 becomes insufficient.

On the other hand, in a case that the temperature of the silicon rubber 6 is high temperature, the sealing or adhesion between the aluminum cap 2 and the container 1 becomes too strong, and/or nonconformity such as melting of the flange portion of the container 1 or the like are generated.

In FIG. 4, a temperature measuring device 7 (temperature sensor) is provided on an end portion on a downstream side (right end in FIG. 4) of the seal portion 23, and the temperature sensor 7 has a function of measuring a temperature of the seal head 4 in the vicinity and transmitting the measurement result to a control device 8 (control unit).

Moreover, the filling machine 20 comprises a container detection sensor 9 and an inverter (container-conveyance drive source: not shown), and the inverter has a function of controlling/driving a rotation speed of the pressurizing plate 5 (that is, a moving speed of the container 1) by a control signal of the control unit 8.

The container 1 flows through the filling portion 21 and the intermediate star wheel 22, and sealing (adhesion) between the aluminum cap 2 (FIG. 3) and the container 1 is carried out in the seal portion 23. The path of the container 1 is shown by an arrow A.

In FIG. 4, in the seal portion 23, the container 1 is positioned each of positions of which correspond to the seal heads 4 being provided in plural in the circumferential direction of the pressurizing plate 5 respectively. In other words, the container 1 (container 1 being capped with the cap 2) is disposed below a position corresponding to the seal head 4, and the container 1 is conveyed in the seal portion 23 by the rotation of the pressurizing plate 5.

The heating portion 3 is fixed/disposed on a partial region of the pressurizing plate 5, and in FIG. 4, the heating portion 3 is disposed in an area being above the pressurizing plate 5, and the heating coil 3A (see FIG. 3) and high-frequency current generating means (not shown) are disposed.

In FIG. 4, the temperature of the silicon rubber 6 (elastic material, FIG. 3) is detected by the temperature sensor 7 being provided in the vicinity area of an outlet (end portion on the downstream side: right end in FIG. 3) of the heating portion 3.

Here, the temperature detection of the silicon rubber 6 is carried out by using the non-contact type infrared thermometer, for example. A well-known commercial product can be used as the non-contact type infrared thermometer.

The temperature measurement result of the silicon rubber 6 (silicon rubber 6 in the seal head 4 in the vicinity of the outlet of the heating portion 3) detected by the temperature sensor 7 is transmitted to the control device 8 (control unit) through a signal line SL1.

The control unit 8 determines an appropriate rotation speed of the pressurizing plate 5 on the basis of the temperature measurement result transmitted from the temperature sensor 7 and transmits the control signal (control signal relating to the rotation speed of the pressurizing plate 5) to the inverter (container-conveyance drive source: not shown) through a signal line SL2.

By transmitting the control signal (control signal relating to the rotation speed of the pressurizing plate 5) to the inverter (not shown) from the control unit 8, the rotation speed of the pressurizing plate 5, that is, the moving speed of the container 1 is controlled.

In a case that the temperature of the silicon rubber 6 being contacted with the cap 2 of the container 1 is low temperature, the control signal is transmitted to the not shown inverter from the control unit 8 so as to decelerate the rotation speed of the pressurizing plate 5. As a result, the moving speed of the container 1 is slowed down (decelerated), time period for induction heating of the aluminum cap 2 is extended (prolonged), and the temperature of the cap 2 can be raised to a desired temperature, and thus, the aluminum cap 2 can be reliably bonded to the container 1 by the hotmelt.

On the other hand, in a case that the temperature of the silicon rubber 6 is too high (high temperature), the moving speed of the container 1 is accelerated by accelerating the rotation speed of the pressurizing plate 5. As a result, the time period for induction heating of the cap 2 is shortened, the hotmelt is melted properly, and nonconformities of the melting the flange portion of the container 1 or the like can be prevented.

Moreover, for example, the rotation speed of the pressurizing plate 5, that is, the moving speed of the container 1 can be set in accordance with the temperature of the silicon rubber 6 in advance, and the rotation speed can be changed in accordance with the temperature rise.

Here, the moving speed of the container 1 may continuously change in accordance with the temperature of the silicon rubber 6 or may intermittently change. In a case that the moving speed of the container 1 is to be intermittently changed, for example, the pressurizing-plate rotation speed is set in plural stages (five stages, for example) in accordance with the temperature measurement result of the temperature sensor 7 in advance.

In FIG. 4, on an upstream side of the heat-seal device 10 (upstream side of an inlet of the filling portion 21 in the illustrated embodiment), the container detection sensor 9 which detects passage of the container 1 is disposed, and a detection signal of the container detection sensor 9 is transmitted to the control unit 8 through a signal line SL3. Here, in reference with FIG. 4, an operation carried out by the illustrated embodiment will be described.

In FIG. 4, when the container 1 moves to the position P1, the detection signal of the container detection sensor 9 is transmitted to the control unit 8. After receiving said detection signal, the control unit 8 transmits a signal for starting the measurement of the temperature to the temperature sensor 7 through the signal line SL1.

Actually, the first time period (the first time lag) is generated between the detection of the container 1 and the temperature measurement, and the timing at which the measurement of the temperature is started, the container 1 has moved to the position P10.

In the illustrated embodiment, after the temperature measurements of 36 pieces of the silicon rubbers 6 have been carried out, the rotation speed of the pressurizing plate 5 is determined on the basis of the lowest temperature in the 36 temperature measurement results. For example, first, the rotation speed corresponding to the temperature of the relevant silicon rubber 6 (the lowest temperature of the 36 silicon rubbers 6) is determined within the rotation speeds (rotation speeds in the five stages, for example), in accordance with the temperature of the silicon rubber 6. Then, a control signal corresponding to the determined rotation speed is transmitted from the control unit 8 to the inverter (not shown).

The rotation speed of the pressurizing plate 5 is determined on the basis of the lowest temperature in the large number of measured values (measured values of the temperatures of the 36 pieces of the silicon rubbers 6), because prevention of defective sealing being generated when the seal head 4 has a low temperature is the most important purpose of the illustrated embodiment.

At the time when the temperature measurements of the 36 pieces of the silicon rubber are carried out, the container 1 which was first detected by the container detection sensor 9 moves from the position P10 to the position P46 (=10+36). That is, a second time period (second time lag) is necessary as the required time for carrying out the temperature measurements of the 36 pieces of the silicon rubber.

Moreover, at the time at the position P46, the rotation speed of the pressurizing plate has not been changed yet, and from here, a third time period (third time lag) is required to change (switch) actually the rotation speed of the pressurizing plate 5 after transmitting the control signal for switching the rotation speed from the control unit 8 to the inverter.

The third time period (third time lag) corresponds to a time period which is required for moving the container 1 from the position P46 to the position P65 at which the container 1 is immediately up-stream position flowing into the heating portion 3.

As described above, in FIG. 4, it is necessary to elapse a predetermined time period corresponding to the sum of the first time period (first time lag), the second time period (second time lag) and the third time period (third time lag). Said predetermined time period starts from the detection of the container 1 by the container detection sensor 9 to the entry into the heating portion. In other words, in order to determine the rotation speed of the pressurizing plate 5 at the time when the container 1 enters the heating portion, it is necessary to provide the container detection sensor at an appropriate position and to start the control. Since the first to third time periods (time lags) are changed depending on the number of seal heads or the type of the inverter, it is necessary for the first to third time period (time lags) to be determined in accordance with the aforementioned construction.

The control carried out in the illustrated embodiment will be described in reference with FIG. 5 mainly.

Figure 5:
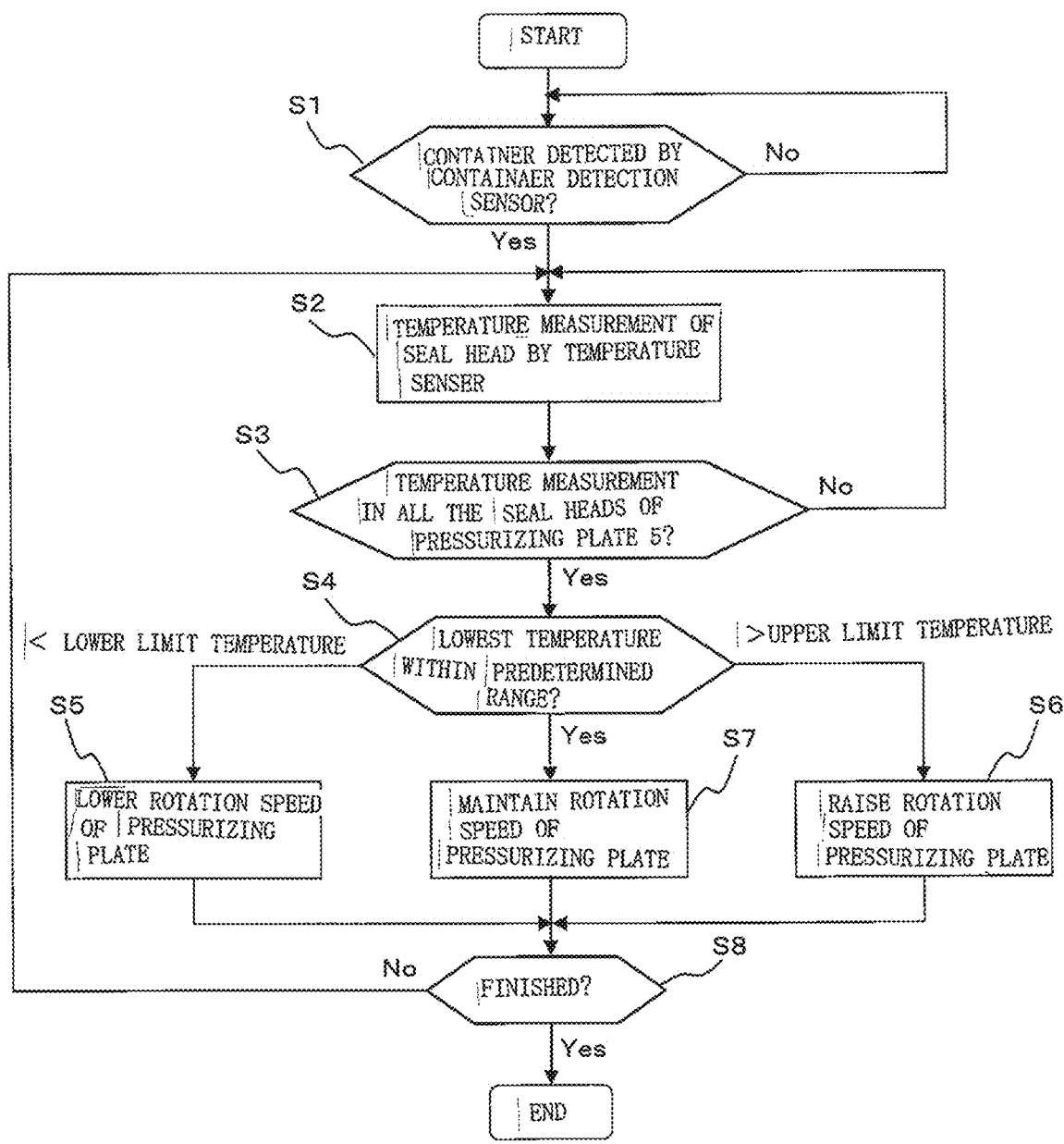
FIG. 5 is a flowchart illustrating control of the embodiment shown by the drawings.

In FIG. 5, at Step S1, it is determined whether or not the container 1 (FIGS. 3 and/or 4) being conveyed has been detected by the container detection sensor 9 (FIG. 4) which sensor is disposed at the predetermined position (position P1) in the filling machine 20.

At Step S1, in a case that the container 1 is detected ("Yes" at Step S1), the control process proceeds to Step S2, while in a case that the container 1 is not detected, Step S1 is repeated (loop of "No" at Step S1).

At Step S2 (in the case that the container detection sensor 9 has detected the container 1), measurement of the temperature of the seal head 4 (temperature of the silicon rubber 6) by the temperature sensor 7 (FIG. 4) is started. The temperature measurement is sequentially performed for all the (36 pieces of, for example) seal heads 4 of the pressurizing plate 5 (FIG. 3, FIG. 4). In the illustrated embodiment, the temperature measurement of the seal head 4 is started after the predetermined time ("first time period or first time lag" described above in reference with FIG. 4) has elapsed since the time at which the container 1 was detected at Step S1. Then, the control process proceeds to Step S3.

At Step S3, it is determined whether the temperatures of all the (36 pieces of) seal heads 4 disposed at equal interval in the circumferential direction of the pressurizing plate 5 have been measured or not.

As the result of the determination at Step S3, in a case that the temperature was measured for all the seal heads 4 of the pressurizing plate 5 ("Yes" at Step S3), the control process proceeds to Step S4, while in a case that the temperature has not been measured for all the seal heads 4 of the pressurizing plate 5 (the temperature measurement has not been completed) ("No" at Step S4), the control process returns to Step S2, and the temperature measurement of the seal head 4 is continued.

At Step S4 (in the case that the temperatures of all the seal heads 4 of the pressurizing plate 5 have been carried out), the lowest temperature is specified from the temperature measurement values of the silicon rubber 6 in all the (36 pieces of) seal heads 4 of the pressurizing plate 5 which temperature was measured at Step S3. And it is determined whether the specified lowest temperature is within the predetermined range, is lower than a predetermined lower limit temperature or is higher than a predetermined upper limit temperature.

The optimal temperature range is different depending on the rotation speed of the pressurizing plate, but the "predetermined lower limit temperature" is the lowest temperature at which the temperature of the cap 2 is not lowered, an adhesion force of the hotmelt does not become insufficient, and no problem is generated in the sealing performance between the seal (adhesion) of the cap 2 and the container 1, while the "predetermined upper limit temperature" is the highest temperature at which the temperature of the cap 2 does not become too high, nonconformity such that melting of the flange portion of the container 1 at sealing or the like are not generated, and there is no "problems in the feeling at opening".

Therefore, if it is the predetermined lower limit temperature or more and the predetermined upper limit temperature or less, that is, the temperature is within a predetermined range, proper heat-seal can be realized.

At Step S4, in a case that the lowest temperature is lower than the "predetermined lower limit temperature", the control process proceeds to Step S5, in a case that the lowest temperature is higher than the "predetermined upper limit temperature2, the control process proceeds to Step S6, and in a case that the lowest temperature is within the "predetermined range", the control process proceeds to Step S7.

At Step S5 (in the case that the lowest temperature is lower than the "predetermined lower limit temperature"), the control signal is transmitted to the inverter so as to decelerate (lower) the rotation speed of the pressurizing plate 5 and to decelerate (lower) the moving speed of the container 1.

By decelerating (lowering) the moving speed of the container 1 so as to decelerate (lower) the moving speed of the container 1, time period for induction heating is extended (prolonged), and proper time can be ensured for the induction heating of the cap 2.

When Step S5 is carried out, the processing proceeds to Step S8.

At Step S6 (in the case that the lowest temperature is higher than the "predetermined upper limit temperature"), the control signal is transmitted to the inverter so as to accelerate (quicken) the rotation speed of the pressurizing plate 5, and the moving speed of the container 1 is accelerated (quickened). By accelerating (raising) the rotation speed of the pressurizing plate 5, the time period for induction heating of the cap 2 is shortened, the adhesion force of the hotmelt does not become too strong but to be proper, and nonconformity such that melting of the flange portion of the container 1 or the like are prevented. When Step S6 is carried out, the control process proceeds to Step S8.

At Step S7 (in the case that the lowest temperature is within the "predetermined range"), the rotation speed of the pressurizing plate 5 is maintained, and the moving speed of the container 1 is maintained.

When Step S7 is carried out, the control process proceeds to Step S8.

Here, at Step S4 to Step S7 described above, controls of "decelerating (lowering) the rotation speed of the pressurizing plate 5", "accelerating (raising) the rotation speed of the pressurizing plate 5", and "maintaining the rotation speed of the pressurizing plate 5" are carried out in the case that the lowest temperature of the seal head 4 is "a temperature lower than the lower limit temperature", in the case that the lowest temperature of the seal head 4 is "a temperature higher than the upper limit temperature", and in the case that the lowest temperature of the seal head 4 is "within the predetermined range (at the lower limit temperature or more and the upper limit temperature or less) "respectively.

Instead of that, a relationship between the lowest temperature of the seal head 4 and the rotation speed of the pressurizing plate 5 is determined in advance, and the rotation speed of the pressurizing plate 5 can be determined on the basis of said relationship and the lowest temperature of the seal head 4. Said relationship here may be a table, a calculation formula and others.

At Step S8, it is determined whether the control process shown in FIG. 5 is to be finished or not. Here, determination standards for the finishing can be defined arbitrarily in accordance with the embodiment.

At Step S8, in a case that the control process is not to be finished ("No" at Step S8), the control process returns to Step S2, and the temperature measurement and the rotation speed control of the pressurizing plate 5 are continued.

According to the illustrated embodiment, the temperature of the silicon rubber 6 of the seal head 4 is measured by the temperature sensor 7 (a non-contact type infrared temperature sensor, for example), in the case that the temperature of the silicon rubber 6 is low, the control signal is transmitted to the inverter (container-conveyance drive source) so as to decelerate (slow) the rotation speed of the pressurizing plate 5 (moving speed of the container 1), while in the case that the temperature of the silicon rubber 6 is high, the rotation speed of the pressurizing plate (moving speed of the container 1) is accelerated (quickened).

Therefore, in the case that the temperature of the silicon rubber 6 is low, lowering of the temperature of the cap 2 is prevented, the temperature of the cap 2 is raised by the induction heating to the desired temperature, the cap 2 is reliably bonded to the container 1 by the hotmelt, and defective sealing can be prevented.

On the other hand, in the case that the temperature of the silicon rubber 6 is high, the rotation speed of the pressurizing plate 5 is accelerated (quickened) so as to accelerate (quicken) the moving speed of the container 1, and the time period for the induction heating of the cap 2 is shortened, whereby the temperature of the cap 2 is kept in a proper range, the sealing does not become too strong, nonconformity such that melting of the flange portion of the container 1 or the like are prevented.

In other words, in the illustrated embodiment, the rotation speed of the pressurizing plate 5 of the filling machine 20 or the moving speed of the container 1 are controlled in associated with the temperature of the silicon rubber 6 (elastic material) disposed on the pressurizing plate 5 as a parameter, so that a product without any problem in the sealing performance and the opening feeling can be provided.

Moreover, in the illustrated embodiment, on the basis of a detection signal of the container 1 from the container detection sensor 9 disposed in the filling machine 20 and disposed on the upstream side of the temperature sensor 7 (heat-seal device 10), the temperature measurement of the seal head 4 is started.

Then, after the temperature measurements are finished (temperature measurement of all the seat heads 4 of the pressurizing plate 5), the rotation speed of the pressurizing plate 5 to be changed (switched) on the basis of the lowest temperature in all the measurement values is determined, the control signal for the changing (switching) is transmitted to the inverter, and the rotation speed of the pressurizing plate 5 is actually changed (switched).

At that time, the control unit 8 starts the control process after the container 1 is detected, and the detection position of the container is defined to a position considering the first to third time periods (time lags), therefore, wasteful power supply (wasteful induction heating) is prevented by carrying out the heat-seal efficiently at appropriate timing, moreover, the induction heating can be carried out reliably at required timing.

In the illustrated embodiment, the relationship between the heating time of the cap 2 and the temperature of the silicon rubber 6 was experimented by using the containers having the size of mouth portions with outer diameters of 25 mm, 28 mm, and 35 mm.

The heating time of the cap 2 and the temperature of the silicon rubber 6 were changed, and results of the check of the seal states respectively are shown in Table 1 (size of the mouth portion with the outer diameter of 25 mm), Table 2 (size of the mouth portion with the outer diameter of 28 mm), and Table 3 (size of the mouth portion with the outer diameter of 35 mm).

In each of Tables 1 to 3, a "circle" mark indicates an appropriate seal state;

a "cross" mark indicates that the heating time is short, and the adhesion of the cap is insufficient; and a "double cross" mark indicates that the sealing is too strong and/or the flange of the container has melted.

TABLE 1

Mouth Portion with Outer Diameter of 25.0 mm

| Temperature of Silicon Rubber 6 | Heating Time (sec) of Cap 2 (x) | | | |
|---|---|---|---|---|
| (° C.) (y) | 1.35 | 1.56 | 1.72 | 1.91 |
| 48.7 | O | XX | XX | XX |
| 45.5 | O | XX | XX | XX |
| 45.0 | O | XX | XX | XX |
| 43.9 | O | XX | XX | XX |
| 43.6 | O | XX | XX | XX |
| 42.1 | O | XX | XX | XX |
| 41.9 | O | O | XX | XX |
| 41.8 | O | O | XX | XX |
| 40.6 | X | O | XX | XX |
| 40.5 | X | O | XX | XX |
| 38.5 | X | O | XX | XX |
| 38.2 | X | O | XX | XX |
| 37.7 | X | O | XX | XX |
| 35.3 | X | O | XX | XX |
| 35.1 | X | O | XX | XX |
| 31.6 | X | X | O | XX |
| 29.9 | X | X | O | O |
| 29.6 | X | X | O | O |
| 29.1 | X | X | O | O |
| 29.0 | X | X | O | O |
| 27.2 | X | X | X | O |
| 24.7 | X | X | X | O |

TABLE 2

Mouth Portion with Outer Diameter of 28.0 mm

| Temperature | Heating Time (sec) of Cap 2 (x) | | | | |
|---|---|---|---|---|---|
| ° C. | 1.42 | 1.49 | 1.62 | 1.69 | 2.00 |
| 45.3 | O | XX | XX | XX | XX |
| 43.3 | X | O | XX | XX | XX |
| 40.0 | X | X | O | XX | XX |
| 37.2 | X | X | O | XX | XX |
| 35.0 | X | X | O | XX | XX |
| 33.4 | X | X | X | O | XX |
| 32.7 | X | X | X | O | XX |
| 30.0 | X | X | X | O | XX |
| 29.1 | X | X | X | X | O |
| 26.2 | X | X | X | X | O |

TABLE 3

Mouth Portion with Outer Diameter of 35.0 mm

| Temperature | Heating Time (sec) of Cap 2 (x) | | | | |
|---|---|---|---|---|---|
| ° C. | 1.50 | 1.58 | 1.74 | 2.02 | 2.29 |
| 48.5 | O | XX | XX | XX | XX |
| 40.0 | X | O | XX | XX | XX |
| 35.3 | X | X | O | XX | XX |
| 31.7 | X | X | X | O | XX |
| 31.0 | X | X | X | O | XX |
| 28.4 | X | X | X | X | O |
| 27.9 | X | X | X | X | O |
| 26.8 | X | X | X | X | O |

As the results of Table 1 to Table 3, it was found out that the heating time only needs to be adjusted by controlling the rotation speed of the pressurizing plate so that the following formula is satisfied:

$$((94.0-y) \times ((d+50)/75))/39.6$$

$$<x$$

$$<((102-y) \times ((d+50)/75))/35.6$$

x: Heating time (seconds) of the cap, y: Temperature (° C.) of silicon rubber 6, d: Outer diameter (mm) of mouth portion Moreover, it was confirmed that the illustrated embodiment can be applied to containers with the size of the mouth portions of the outer diameters from 20 mm to 40 mm.

If conditions are varied depending on processing capacity of the device, the shape and the material of the cap, and construction of the heating portion, the aforementioned formula needs to be reconstructed.

It is to be noted that the illustrated embodiment is only example and is not statement intended to limit the technical range of the present invention.

REFERENCE SIGNS LIST

1 Container
1A Opening portion (mouth portion)
2 Cap (aluminum cap)
3 Heating portion
4 Seal head
Pressurizing plate
6 Elastic material (silicon rubber, for example)
7 Temperature sensor (non-contact type infrared temperature sensor, for example)
8 Control unit (control device)

9 Container detection sensor
10 heat-seal device
100 Manufacturing apparatus

The invnetion claimed is:

1. A heat-seal device used in a manufacturing apparatus manufacturing a product in which an opening portion of a container is sealed with a cap, characterized in that
 a pressurizing plate is provided in a path on which the container moves,
 a heating of the cap is carried out by an induction heating,
 a seal head, which presses the cap covering the container, and a heating portion which heats said cap by the induction heating, are disposed on the pressurizing plate,
 a temperature measuring device, which measures a temperature of the seal head, and a control device, which transmits a control signal on the basis of a measurement result of the temperature measuring device to a container-conveyance drive source, are provided, and that
 the control device has a function of adjusting a moving speed of the container in accordance with the temperature of the seal head, a function of decelerating the moving speed in a case that the temperature of the seal head is low, and a function of accelerating the moving speed in a case that the temperature of the seal head is high; and a function of adjusting the heating time of the cap.

2. The heat-seal device according to claim 1, wherein
 a container detection sensor is provided on an upstream side of the temperature measuring device; and
 such a function is provided that the temperature measuring device starts temperature measurement of the seal head after certain time has elapsed since the container detection sensor detects the container; and that
 at time of start of the sealing, a control signal of the control device has been transmitted to the container-conveyance drive source, and adjustment of the moving speed of the container has been carried out.

3. The heat-seal device according to claim 2, wherein
 an elastic material is disposed at a portion of the seal head which portion is in contact with the container mouth portion, and the temperature measuring device carry out the temperature measurement of the elastic material.

4. The heat-seal device according to claim 2, wherein
 the seal head is disposed circumferentially on the pressurizing plate, and the container which is into contact with the seal head moves in accordance with rotation of the pressurizing plate.

5. The beat-seal device according to claim 1, wherein
 an elastic material is disposed at a portion of the seal head which portion is in contact with the container mouth portion, and the temperature measuring device carry out the temperature measurement of the elastic material.

6. The heat-seal device according to claim 5, wherein
 the seal head is disposed circumferentially on the pressurizing plate, and the container which is into contact with the seal head moves in accordance with rotation of the pressurizing plate.

7. The heat-seal device according to claim 1, wherein
 the seal head is disposed circumferentially on the pressurizing plate, and the container which is into contact with the seal head moves in accordance with rotation of the pressurizing plate.

8. The heat-seal device according to claim 7, wherein
 the seal head is disposed circumferentially on the pressurizing plate, and the container which is into contact with the seal head moves in accordance with rotation of the pressurizing plate.

9. A heat-seal method using the heat-seal device according to claim 1, wherein
 a temperature of a seal head is measured by a temperature measuring device;
 a control signal is transmitted to a container-conveyance drive source on the basis of a temperature measurement result of the seal head; and
 heating time of a cap is determined in accordance with the temperature of the seal head.

* * * * *